Feb. 17, 1953

G. P. DE WESTFELT 2,629,077

SERVOMOTOR NETWORK

Filed June 17, 1948

INVENTOR
GERARD P. DE WESTFELT
BY
Herbert H. Thompson
his ATTORNEY.

Patented Feb. 17, 1953 2,629,077

UNITED STATES PATENT OFFICE 2,629,077

SERVOMOTOR NETWORK

Gerard P. de Westfelt, New York, N. Y., assignor to The Sperry Corporation, a corporation of Delaware Application June 17, 1948, Serial No. 33,589

1 Claim. (Cl. 318—458)

Figure 1:
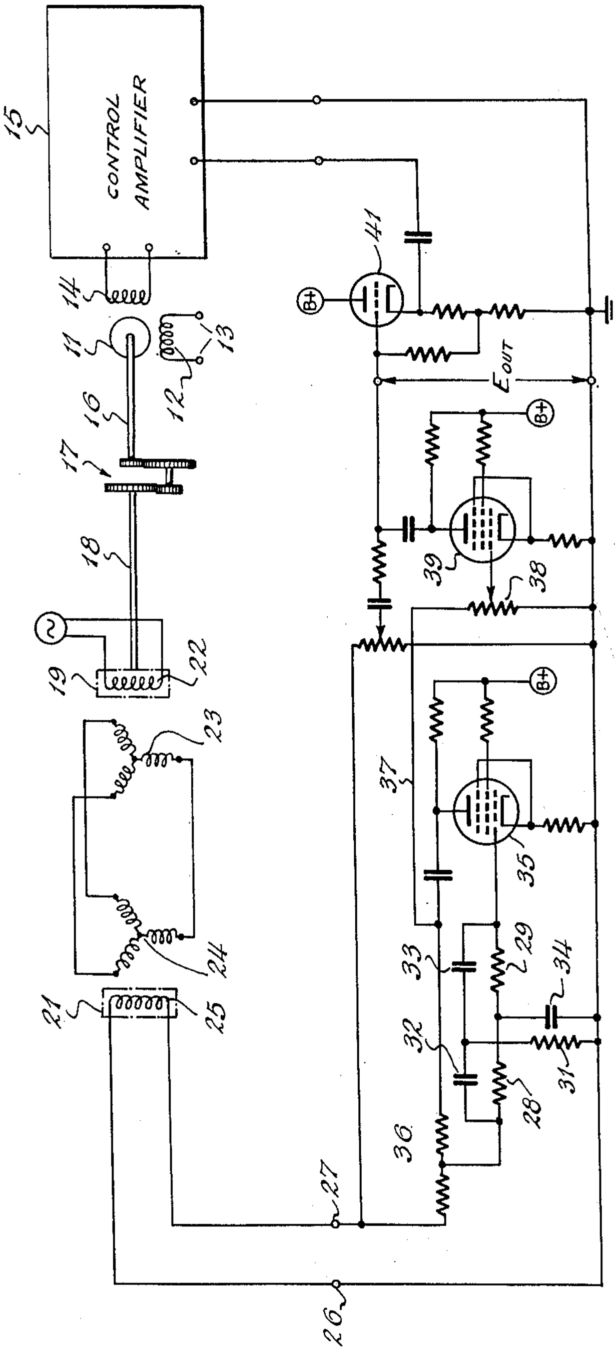

This invention concerns servomotor systems and is particularly related to stabilization networks for improving servomotor response characteristics.

In a copending application of Gifford White et al., Serial No. 425,002, filed December 30, 1941, and entitled "Rate Circuits," now U. S. Patent No. 2,446,567, a servomotor system is disclosed wherein circuits providing modulated rate signals are obtained directly from modulated error signals, and these modulated rate signals are utilized to stabilize and otherwise improve servomotor operation. More particularly, an alternating rate circuit is disclosed, in the mentioned application, wherein double T resistance-reactance networks are employed to advantage. However, while this type of rate circuit is particularly useful in systems where the modulated error signal is based upon a carrier frequency having a relatively low range, it has been found that the advantages of simplicity and stability obtainable from such a system over the conventional demodulation rate networks are limited to those low frequencies. One reason for this limitation appears to be found in the fact that as the carrier frequency is increased the width of the side bands, from which the stabilizing rates are taken, becomes an ever smaller percentage of the carrier frequency. For example, with a 60 cycle carrier frequency and a system frequency of 5 cycles per second, the side bands are 8.3 percent of the carrier frequency and a variation of 2 or 3 percent in the carrier frequency would still leave some side band width to work on. On the other hand, at 400 cycles carrier frequency, the same system frequency of 5 cycles per second is only 1.2 percent of the carrier frequency and even a 1 percent variation in carrier frequency would practically obliterate the side bands. Consequently, it is seen from this example, that the system of rate stabilization disclosed in the mentioned copending application, can be advantageously employed only in systems where the system frequency can be kept constant to the necessary degree, or where the carrier frequency is relatively low.

It is, therefore, a primary object of the instant invention to provide a modulated rate signal from a modulated error signal by a system that is relatively independent of variation of carrier frequency.

A further object is to provide a stable system wherein a reasonable stability of carrier frequency is desirable but is not a requirement unless the system frequency is very low.

A further object is to provide an alternating current rate network having relatively high Q, or selectivity, at resonant frequency. In other words, it is an object to provide a modulated rate signal wherein the resonance curve of the unit is very sharp, or wherein the attenuation is very low at frequencies adjoining the carrier.

A still further object is to provide a circuit for producing a modulated rate signal wherein the amount or level of rate damping is adjustable, to thereby afford wide latitude of damping over the range from no damping to critical damping.

Other objects and advantages of this invention will become apparent as the description proceeds.

Figure 2:
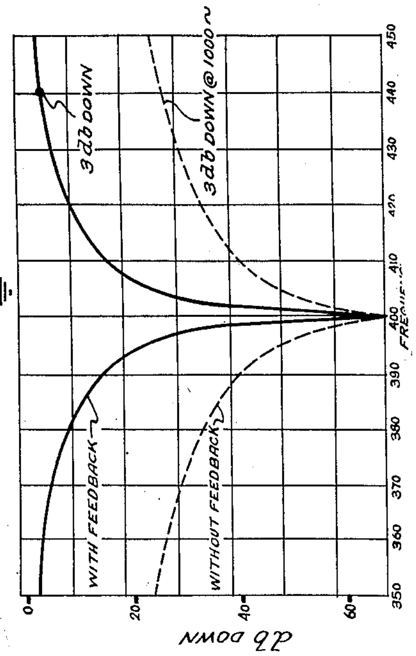

In the drawings,

Fig. 1 represents a schematic wiring diagram embodying the instant invention; and Fig. 2 illustrates resonance curves in the area adjoining the carrier or resonant frequency.

Referring now to Fig. 1 of the drawings, the servomotor 11 is illustrated as being of the two phase type, having one field winding 12 energized from a suitable source of alternating voltage 13, and the other winding 14 energized from the output of the control amplifier 15 which may be of a linear type usually used in servomotor circuits. The object of servomotor 11 is to position, through shafts 16 and 18 and associated gearing mechanisms 17, the positionable member 19, to be in rotational agreement with the reference member 21. It may be assumed that reference member 21 may be of a sort that may be positioned at will, by any device known to the art though not illustrated herein.

Positionable member 19 is provided with a winding 22, which by virtue of its being mounted as a rotor within the three phase winding 23, may be considered to be a synchro. A second three phase winding 24, interconnected with winding 23, together with the second rotor winding 25, which is associated to rotate with the reference member 21, completes the error signal generating means. When a positional disagreement exists between the reference member 21 and the positionable member 19, an error signal will be generated in the synchro system and this error signal may be used to cause servomotor 11 to operate in a sense to remove this disagreement.

It is to be understood that while a synchro system has been illustrated as being the source of the error signal, many other sources, such as "E" pick-offs, or "Bolometers" are well known in the art and would serve equally well for the purposes herein intended. In the event a bolometer type pick-off is employed the error signal may require a preamplifying stage, including a phase shift network. Such a network is not illustrated, for this technique is well known in the art.

The error signal from the synchro generator may then be applied at the input terminals 26 and 27. As in the aforementioned copending application, a parallel T network, including the resistors 28, 29, and 31, together with the condensers 32, 33 and 34, is employed to obtain a modulated rate signal directly from the modulated error signal that was applied at the input terminals 26 and 27. The output from the parallel T network is in turn applied to the grid of an electron discharge device 35, which is arranged in a conventional manner to amplify the output from the parallel T network, which output is now a modulated rate signal. The amplified output from electron discharge device 35 is arranged to be transmitted as a negative feed back to the parallel T network, being applied through the voltage dividing resistor 36, wherein the signal entering the parallel T network is properly reduced, thereby permitting the production of a very sharp null point in the response characteristics of the parallel T network.

The modulated rate signal from the electron discharge device 35 is also applied by the line 37 to the potentiometer 38 thereby affording means for adjsuting the level of rate damping that is obtained. This becomes an important feature as the speed of response of the system may now be increased by weakening the level of damping, or the speed of response of the system may be decreased, by strengthening the level of damping to critical. An adjustable signal is therefore fed to the grid of a second electron discharge device 39. Electron tube 39 serves to amplify the voltage output of the derivative-taking parallel T network and the output of said tube is combined with a component of the signal derived from the signal generator. The output from the device 39 is combined with the original error signal that is present at input terminals 26 and 27. The combined error signal and the output from device 39, are then supplied to triode 41, the output from which is supplied to the control amplifier 15, whereupon the servomotor may be controlled in accordance with the error signal and the error rate signal.

The effect of the circuits described, on the operation of the servomotor in the region of the resonant, or carrier frequency, may be visualized from the graph of Fig. 2. The dotted line of Fig. 2 represents the relation "db down" to "carrier frequency" for a conventional circuit employing a parallel T network but without feed back. While the values presented on the graph are taken from a typical system, they are included for purposes of illustration only as the system disclosed would find application at any carrier frequency. In the case of the system having the response characteristic illustrated by the dotted line the Q of the system equaled 0.2. In the circuits of the present invention a very sharp curve was obtained as illustrated by the solid line, and the Q of the overall system was increased 20 times to 4.0. While the operational advantages of the disclosed systems are capable of mathematical proof, such proof has not been included herein, as it can be readily seen from the above that the circuits disclosed yield a servo system having very high performance characteristics. The increased Q therefore provides a network that is capable of producing a very sharp response curve as illustrated in Fig. 2 and this high Q is primarily a result of two factors, these factors include the amplification factor of tube 35 and the feed back voltage from tube 35 into the voltage dividing resistor 36.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

In a servomotor control system, the combination with a source of variable amplitude, reversible phase, alternating error signal voltage, of a motor and a control circuit for controlling said motor in accordance with said error signal, said circuit having input terminals connected to receive said error signal and comprising a parallel T network including impedance and reactance elements having its input connected to receive said error signal, the values of the network elements being so chosen and said elements being so constructed and relatively arranged in circuit as to provide an alternating rate output voltage substantially proportional to a time derivative of the input signal, said rate voltage being phase shifted substantially 90° from the input error signal and reversing in phase depending upon whether the input error signal voltage to said network is increasing or decreasing, a first amplification stage having the rate voltage output of said network connected to the input thereof to control its output, the output of said first stage being connected in degenerative fashion to the input of said network such that the feedback signal is substantially 180° out of phase with the rate signal, whereby the signal to noise ratio is so materially improved that the rate signal may be amplified, a second amplification stage, the rate signal output of said first amplification stage being also connected to the input of said second amplification stage to control its output, and means for adding the output of said second amplification stage with the error signal in such relative phase relation that said rate signal leads the error signal by substantially 90°.

GERARD P. DE WESTFELT.

REFERENCES CITED

The following references are of record in the file of this patent:

UNITED STATES PATENTS

| Number | Name | Date |
|---|---|---|
| 2,245,365 | Riddle, Jr. | June 10, 1941 |
| 2,372,419 | Ford et al. | Mar. 27, 1945 |
| 2,382,097 | Purington | Aug. 14, 1945 |
| 2,446,567 | White et al. | Aug. 10, 1948 |